United States Patent [19]

Schmidt

[11] Patent Number: 4,625,777
[45] Date of Patent: Dec. 2, 1986

[54] FUEL TANK VENTILATING SYSTEM
[75] Inventor: Wilfried Schmidt, Bingen, Fed. Rep. of Germany
[73] Assignee: General Motors Corporation, Detroit, Mich.
[21] Appl. No.: 796,796
[22] Filed: Nov. 12, 1985
[30] Foreign Application Priority Data
Nov. 17, 1984 [DE] Fed. Rep. of Germany ....... 3442149
[51] Int. Cl.$^4$ .............................................. B67C 3/02
[52] U.S. Cl. .................................. 141/286; 141/309; 141/326; 141/302; 220/86 R; 251/320
[58] Field of Search ............................... 137/527, 855; 251/149.2, 320; 220/86 R; 141/37-66, 1-12, 285-310, 325-327

[56] References Cited
U.S. PATENT DOCUMENTS 3,728,846  4/1973  Nilsson ................................. 55/159
3,732,902  5/1973  Muller .................................. 141/326
4,044,913  8/1977  Brunnert ............................. 141/326

FOREIGN PATENT DOCUMENTS 2752645  9/1981  Fed. Rep. of Germany .

Primary Examiner—Houston S. Bell, Jr.
Attorney, Agent, or Firm—Donald F. Scherer

[57] ABSTRACT

An arrangement for limiting the filling of tanks and for aeration and ventilation of tanks in which a portion of the tank volume acts as a pressure-compensation space for temperature changes, has an aeration and ventilation arrangement opening into the aeratable and ventable filler neck, said arrangement having a filling vent which determines the maximum allowable liquid level and an operating vent to take over aeration and ventilation of the pressure-compensation space with a sealing arrangement, such that the operating vent is sealed off by the action of a spring when the tank cap is removed, and when the tank cap is attached, it is thereby opened against the spring pressure. Operating ventilation is controlled by a valve integrated into the aeration and ventilation line which valve can be actuated against spring resistance by a plunger rod. The valve is placed in the filler neck in such a way that the plunger rod runs parallel or substantially parallel to the side of the filler neck within the same filler neck, and its free end projects from the filler neck when the tank cap is removed.

10 Claims, 7 Drawing Figures

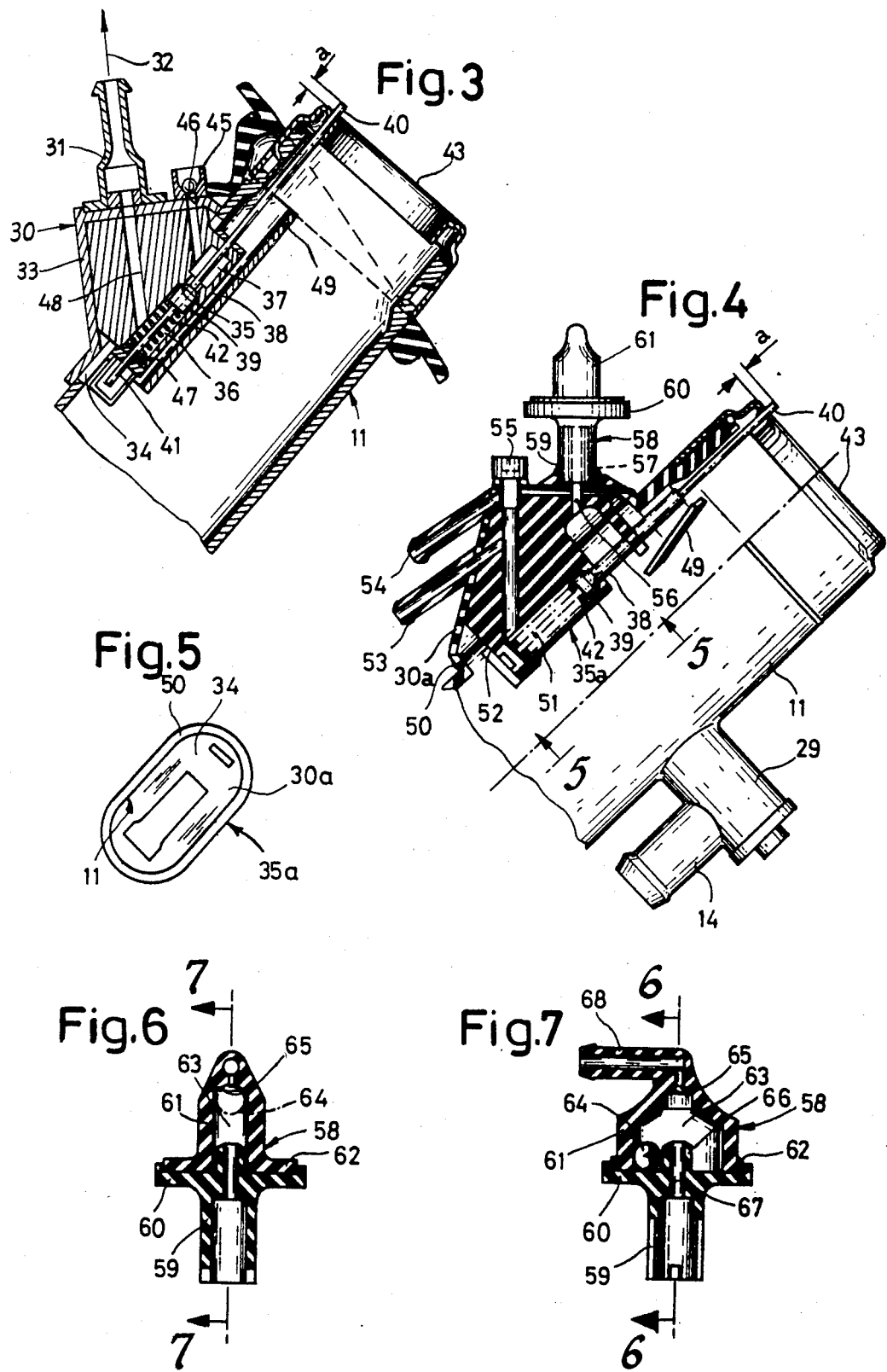

FUEL TANK VENTILATING SYSTEM

BACKGROUND OF THE INVENTION

This invention relates to arrangements for limiting the filling of fuel tanks and for aeration and ventilation of fuel tanks, and more particularly to fuel tanks for motor vehicles in which a portion of the tank volume acts as a pressure-compensation space or accumulator for accommodating temperature changes with an aeration and ventilation arrangement opening into the aeratable and ventable filler neck.

SUMMARY OF THE INVENTION

The purpose of the invention is to produce an even more effective means of limiting filling during tank filling using simple means.

The purpose is achieved, according to the invention, by the fact that control of the operating vent is effected by a valve integrated into the aeration and ventilation line which can be actuated against spring resistance by means of a plunger rod, and that the valve is placed in the filler neck in such a way that the plunger rod lies parallel or substantially parallel to the wall of the filler neck, and its free end projects out of the filler neck when the tank cap is removed.

The invention has the advantage that it can be produced inexpensively, since it is possible for all of the parts, except the plunger rod itself, to be made of plastic.

It is considered advantageous that the valve be placed in a valve housing which is attached to the side of the upper end of the filler neck which has a corresponding recess. In this arrangement, the valve with its piston rod lies within the filler neck as close as possible to its inner wall. The valve thereby offers no obstruction to the pump nozzle when it is inserted during tank filling.

In order to protect the valve from damage caused by the pump nozzle, it is recommended that the valve be protected by means of a shield from the interior of the filler nozzle which accommodates the pump nozzle during tank filling.

In one embodiment of the invention, the valve has two chambers arranged such that one chamber is connected on the one side through an orifice with the interior of the filler nozzle and through a line with the outside atmosphere, and the other chamber, which can be sealed off by the valve body from the interior of the filler nozzle, is connected through a conduit to the operating vent coming from the tank and opening into the valve housing. The line connecting the one chamber with the outside atmosphere can open into an activated-charcoal canister for controlling fuel evaporation.

The design according to the invention for the arrangement of limiting tank filling and aerating and ventilating tanks makes possible an embodiment with an attitude responsive valve is integrated into the valve housing.

Attitude responsive valves have been made known in the art by German Patent publication No. 2,848,546. When the vehicle attitude is at an extreme angle or overturned, the valve prevents leakage of fuel from the fuel tank. In the state of the art up to now, the valve always represented a separate device, independent of filling limitation or of the arrangement for aeration and ventilation of the fuel tank. The present invention makes it possible to produce and install these two units as a single integrated component.

DESCRIPTION OF THE DRAWINGS

FIG. 3 is a sectional view of one embodiment of an arrangement for aeration and ventilation of a fuel tank shown in a longitudinal section through the upper part of the filler neck;

FIG. 4 is a sectional view of another embodiment of an arrangement for aeration and ventilation of a fuel tank in partial section;

FIG. 5 is a view taken in the direction of the arrow 5—5 of FIG. 4;

FIG. 6 is a vertical section taken along line 6—6 of FIG. 7; and

FIG. 7 is a sectional view taken along line 7—7 of FIG. 6.

DESCRIPTION OF THE EMBODIMENTS

Figure 1:
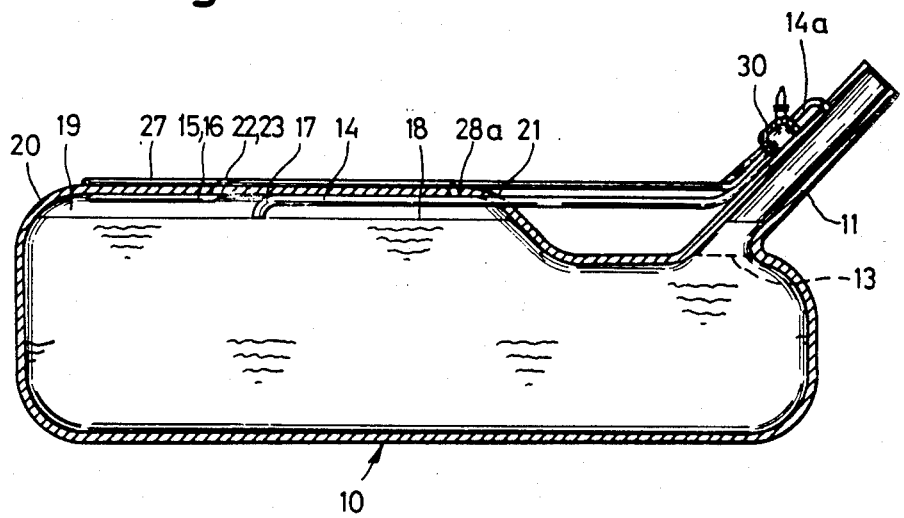
FIG. 1 is a sectional view of a fuel tank for a motor vehicle with various ventilation lines.

In FIG. 1, 10 indicates a fuel tank for a motor vehicle, for example, a passenger car. The fuel tank 10 is relatively flat in shape and has a filler neck 11 projecting upward, which is shown only partially and diagrammatically in FIG. 1. The filler neck 11 can be sealed in the usual way with a conventionally vented fuel cap not shown. The cap may be constructed in accordance with those described in U.S. Pat. Nos. 4,168,011 Lomer and 3,703,245 Brewer. A cap, such as that shown in U.S. Pat. No. 4,142,648 Johnson et al. may be incorporated if a threaded filler neck is used on the fuel tank. The filler neck 11 itself acts essentially as the primary filler vent for the fuel tank 10 during filling of the fuel tank. As soon as the liquid level reaches the lower end of the filler neck 11, indicated as 13, venting of the fuel tank 10 can only occur through an aeration and ventilation arrangement which consists of a primary aeration and ventilation line 14 and three ventilation lines 15, 16 and 27, forming an operating ventilation system. Most of the ventilation function (fill venting) in this instance is initially performed by the line 14, which end 17 within the fuel tank 10, as shown in FIG. 1, is bent perpendicularly downward. The cross section of the filler vent line 14 is dimensioned so that the air forced out of the fuel tank 10 by the liquid during filling can escape unhindered through said line 14. The filling process takes place without hindrance until the liquid level reaches the end 17 of the filler vent line 14. This liquid level is indicated as number 18 in FIG. 1.

The fuel tank 10 cannot be filled above this liquid level 18. There thus remains a residual volume 19, which acts as a pressure-compensation space, i.e., to accommodate any possible excess volume as a result of expansion of the fuel created by a rise in temperature. The size of this residual volume 19 is determined by the position of filler vent line 14 or, more particularly, by its downward pointing end 17. The fuel tank 10 is also aerated through the filler vent line 14 as fuel is used during operation of the vehicle in order to prevent the formation of a vacuum within the tank 10.

The need for ventilation of the fuel tank 10 is therefore present not only up to the point where the maximum liquid filling level 18 is reached, but provisions must also be made for satisfactory ventilation of the residual volume 19 which acts as a pressure-compensation space. A gas mixture forms in the pressure-compensation space consisting of air and fuel vapors, the pressure level of which can rise as the outside temperature increases. In order to eliminate such increases in pressure, a second or operating ventilation line system is provided including the ventilation lines 15, 16 and 27. The outward pointing ends of the two ventilation lines 15 and 16 lie immediately below the upper wall of the fuel tank 10. The third ventilation line 27 communicates with the interior of the fuel tank roughly in the middle of the upper tank wall 20 at point 28a. This ensures unobstructed ventilation of the pressure-compensation space 19 even if the vehicle is at a slight angle or when dynamic forces are present.

Figure 2:
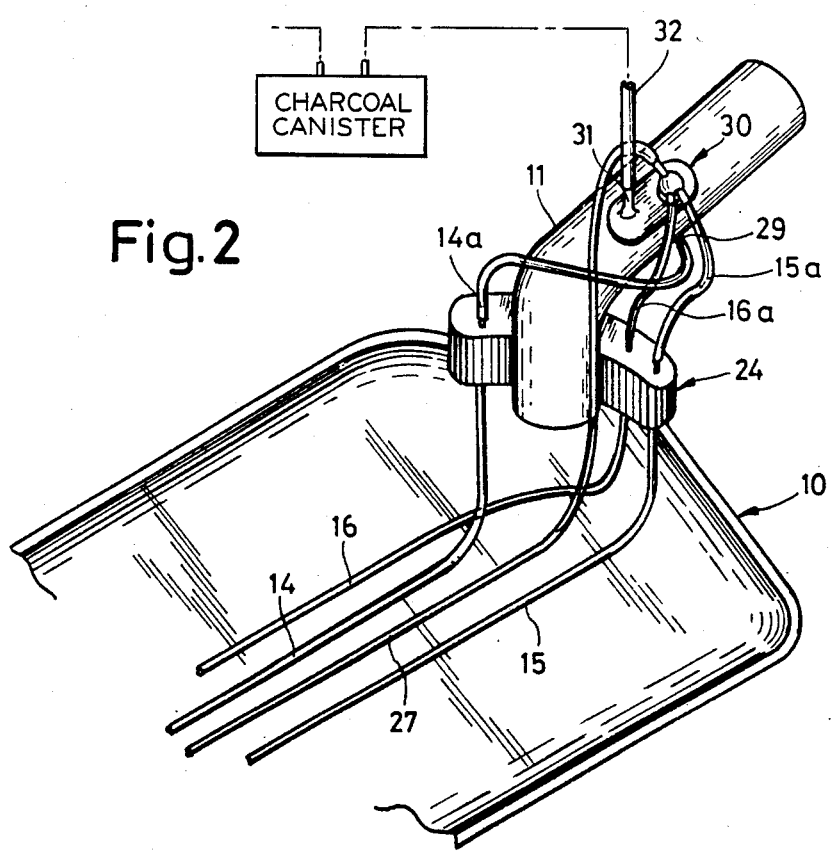
FIG. 2 is a diagrammatic representation of the ventilation lines in the area of the filler neck of a fuel tank according to FIG. 1.

As is further evident from FIG. 1, the filler vent line 14 first runs horizontally inside the fuel tank 10, then passes out through the upper tank wall 20 of the fuel tank 10 at point 21, again runs horizontally and finally opens into a ventilation canister 24 shown in FIG. 2 which has three chambers. The two operating ventilation lines 15 and 16 also open into chambers of the ventilation canister 24. The filler vent line 14 then continues into a conduit 14a which emerges from the ventilation canister 24 and finally opens into the upper portion of the filler neck 11 at point 29.

Continuation lines 15a and 16a of the operating ventilation lines 15 and 16, respectively, also emerge from the ventilation canister 24. However, they do not open directly into the filler neck 11 but into a valve assembly designated 30. The third operating ventilation line 27 bypasses the ventilation canister 24 and also opens into the valve 30. An integral part of the complete valve 30 is an attitude responsive valve such as a ball valve 31, from which a ventilation line 32 leads to an activated charcoal canister shown in phantom. The detailed design and operation of the ball valve 31 may be gathered from FIGS. 6 and 7.

One embodiment of the valve 30 and its operation may be seen in FIG. 3. The valve 30 is enclosed in a valve housing 33 which is attached in the area of a recess 34 in the filler neck 11, which it thereby seals on the side of the filler neck 11. An important part of the valve 30 as a whole is a plunger valve 35 with two chambers 36 and 37. A conical valve seat is formed at 38, operating together with a matching conical valve body 39. Two plunger rods 40 and 41 extend from opposite sides of the valve body 39. Placed within the first chamber 36, surrounding the plunger rod 41, is a helical compression spring 42 which presses the valve body 39 into the valve seat 38 and therefore into the closed position of the plunger valve 35. The second plunger rod 40 indicated on the right side of FIG. 3 serves to actuate the valve body 39 against the pressure of the pressure spring 42. To this end, the length of the plunger rod 40 is such that it projects from the end 43 of the filler neck 11 to a distance a. If the tank cap, not shown, is then placed on the filler neck and screwed onto it, the plunger rod 40 will simultaneously be pushed correspondingly to the left, and the valve body 39 will move away from the valve seat 38. The plunger valve 35 is then open. When the plunger valve 35 is open, the two chambers 36, 37 are directly connected to one another.

To allow the tank cap to actuate the valve body 39 and the plunger rod 40 as described above, the tank cap has a gasket which does not turn when the tank cap is screwed on. The plunger rod 40 can then be actuated by the tank cap gasket.

The valve housing shown in FIG. 3 additionally has a line connector 45 to which one of the three operating ventilation lines 15, 16 or 27 shown in FIGS. 1 and 2 can be connected. Two further similar connectors for the other two lines are omitted from FIG. 3 for the sake of simplicity. Within the valve housing 33, a line connection 46 leads from the connector 45 to the second valve chamber 37. When the plunger valve 35 is closed, operating ventilation of the fuel tank 10 is not possible. This condition occurs when the filler neck 11 is open, i.e., during filling of the tank. When the tank filling process has ended, the cap is screwed onto the filler neck 11 opening the plunger valve 35 and operating ventilation can again take place.

When the filler neck 11 is open, however, ventilation of the fuel tank 10 is restricted solely to fill venting. For this purpose, the first valve chamber 36 is connected through an orifice 47 with the interior of the filler neck 11. Vapors conveyed through the filler vent line 14, 14a into the filler neck can therefore pass through the orifice 47 into the first valve chamber 36 and then through a connection conduit 48 into the line 32 leading to the activated charcoal canister.

FIG. 3 further illustrates that the valve 35 is placed directly against the inner wall of the filler neck 11 and parallel thereto in order to not impede the fuel fill nozzle during the tank filling processing. A shield 49 is provided to prevent the fuel fill nozzle from damaging the plunger valve 35.

The housing of valve assembly 30 can consist entirely of plastic and can be formed as an injection molded part. This makes it possible to produce the plunger valve 35 in a particularly simple and inexpensive manner, since all of the line connectors, conduits and valve chambers 36, 37, including the valve seat 38, can be simultaneously manufactured with the production of the valve housing of assembly 30 in one operation and without subsequent finishing.

Insofar as the filler neck 11 consists of a corresponding plastic material, the plastic valve housing can advantageously be bonded to the filler neck 11. FIG. 4 shows this sort of implementation. The bonded joint between the valve housing, designated 30a, and the filler neck 11 is designated 50. An important difference between this and the implementation in FIG. 3 is the fact that the plunger valve 35a has only a single chamber designated 51. The other components of the valve 35a correspond to the embodiment according to FIG. 3 and are labeled with the corresponding designations. FIG. 4 also shows that the valve chamber 51 is connected through a primary conduit 52 with two line connectors 53, 54 into each of which one of the aeration and ventilation lines for operating ventilation. These might, for example, be the lines visible in FIG. 2, and there designated 15, 16 or 15a, 16a. A third connector for a third aeration and ventilation line is not directly provided for in the embodiment shown in FIG. 4. Instead, the upper end of the conduit 52 is closed and sealed with a screw 55. In place of the screw 55, however, an extension can be installed with a third line connector to a third aeration and ventilation line 27.

As shown in FIG. 2, fill venting is accomplished by means of an aeration and ventilation line 14 which opens into the filler neck 11 at 29. From the interior of the filler neck 11, vapors which arise during the filling process pass into a second conduit 56 in the valve housing 30a. The upper extension of the second conduit 56 forms a line connector 57 onto which a ball valve, designated as 58, is placed. The ball valve 58 is preferably made of the same plastic material as the valve housing 30a and can therefore also be produced by injection molding. In addition, the fact that the two materials of the valve housing 30a on the one hand and the valve 58 on the other are similar creates the advantageous possibility that the valve 58 can be bonded directly onto the valve housing 30a.

In the embodiment according to FIGS. 4 to 7, however, the valve 58 is slipped onto the line connector 57. The valve 58 therefore consists of two parts; namely, a lower sleeve-like extension 59 with a flange 60 and an upper housing part 61. The upper housing part 61 also has a flange which fits into the flange 60 of the lower sleeve part 59. The two flanges 60 and 62 of the valve 58 are preferably glued or bonded together.

Within the upper part 61 of the valve 58 is an elongated valve space 63, in which is placed a valve ball 64. The valve space 63 conically narrows upwards to a valve seat 65. In FIG. 6, the ball 64 is drawn with dotted lines in its position on the valve seat 65. Within the lower part 59 of the valve 58 is a nipple 66 projecting into the valve space 63, which prevents the ball 64 from sealing off the through passage 67 when the vehicle is in its normal position. The closed position of the valve 58, shown with dotted lines in FIG. 6, in which the ball 64 sits on the valve seat 65, only occurs when the vehicle is in an extremely tilted or overturned position. Normally, therefore, the valve 58 is always open.

As shown in FIG. 7, a line connector 68 is present at the upper end of the upper part 61 of the valve 58. An aeration and ventilation line (not shown) can be attached here in order to vent to the outside atmosphere, preferably through an activated charcoal canister, the vapors which arise within the filler neck 11 or the fuel tank 10.

The valve 35a shown in FIGS. 4 and 5 operates as follows. During the tank filling process, the plunger rod 40 projects from the filler neck 11 to a distance a. The valve body 39 is pushed by the pretensioned pressure spring 42 against the valve seat 38, and the valve 35a is therefore closed. In this position, the valve 35a can only effect fill ventilation. When the tank filling process has ended, the filler neck is sealed with the tank cap (not shown). Simultaneously with this operation, the tank cap actuates the plunger rod 40, i.e., the valve body 39 is raised off the valve seat 38, and the plunger valve 35a is opened. In this open valve position, there is a direct connection between the line conduit 52 and the interior of the filler neck 11. The aeration and ventilation lines for operating ventilation attached to the valve housing 30a at 53, 54 now allow the vapors which have collected in the pressure compensation space 19 in the fuel tank 10 to pass through the interior of the filler neck 11 into the second line conduit 56 in the valve housing 30a and from there through the ball valve 58 to an activated charcoal canister.

An aeration and ventilation arrangement of this type is distinguished by being simple and inexpensive to produce, while being simultaneously very reliable in operation. In addition it also allows the integration of an attitude responsive valve usually provided as a separate part.

The embodiments of the invention in which an exclusive property or privilege is claimed are defined as follows:

1. Arrangement for limiting the filling of tanks and for aeration and ventilation of fuel tanks in which a portion of the tank volume acts as a pressure-compensation space with regard to temperature changes, with an aeration and ventilation arrangement opening into an aeratable and ventable filler neck, said arrangement having a filling vent which determines the maximum liquid level considered allowable and an operating vent which takes over aeration and ventilation of the pressure-compensation volume with a sealing system, such that the operating vent is sealed by means of a spring when the tank cap is removed, and opened when the tank cap is put on by action of the same against the spring force, characterized by the fact that a valve integrated into the aeration and ventilation line controls the operating vent, the valve body of said valve being operable against spring resistance by means of a plunger rod, and that the valve is placed in the filler neck in such a way that the piston rod is parallel to the sides of the filler neck, and that its free end projects out of the filler neck when the tank cap is removed.

2. Arrangement according to claim 1, characterized by the fact that the valve is placed in a valve housing, which is attached to the side of the filler neck which has a corresponding depression, so that the valve with its piston rod lies within the filler neck as close as possible to the inner wall thereof.

3. Arrangement according to claim 1, characterized by the fact that the valve is screened off by a barrier from the interior of the filler neck which accommodates the pump nozzle during filling.

4. Arrangement according to claim 1, characterized by the fact that the valve has two chambers of which the first chamber is connected through an orifice on the one side with the interior of the filler neck and through a line on the other side with the outside atmosphere, and that a second chamber which can be sealed off from the interior of the filler neck by means of the valve body is connected through a line to the operating vent and opening into the valve housing.

5. Arrangement according to claim 4, characterized by the fact that the first chamber with the line connecting it to the outside atmosphere opens into an inserted activated charcoal canister for controlling fuel evaporation.

6. Arrangement according to claim 4, characterized by the fact that the two chambers of the valve are directly interconnected when the valve body is raised from the valve seat.

7. Arrangement according to claim 1, characterized by the fact that the valve has a single chamber, which on one side is connected with at least two aeration and ventilation lines emerging from the tank and opening into the valve housing through a first conduit, and which on another side has a connection controlled by the valve body to the interior of the filler neck, and that the interior of the filler neck is connected through a second conduit in the valve housing to the outside atmosphere.

8. Arrangement according to claim 1, characterized by the fact that an attitude responsive valve is inserted in the aeration and ventilation line connected from the valve housing to the outside atmosphere.

9. Arrangement according to claim 2, with a filler neck consisting of plastic, characterized by the fact that the valve housing is bonded onto the outer wall of the filler nozzle.

10. Apparatus for limiting the filling of fuel tanks and for aeration and ventilation of tanks in motor vehicles, wherein a portion of the tank volume acts as an accumulator space with aeration and ventilation passages opening into a filler neck on the fuel tank which is closable with a fuel cap, said passages including a filling vent passage which determines the maximum which determines the maximum liquid level desired at filling and operating vent passage means which accommodate aeration and ventilation of the accumulator, said apparatus including a sealing system, such that the operating vent is sealed when the cap is removed, and opened when the cap is installed, said sealing system comprising valve means integrated into the aeration and ventilation line for controlling the operating vent and including spring means, a valve element operated on by said spring means, a plunger rod secured to said valve, said valve means being disposed in the filler neck in such a way that the plunger rod is parallel or substantially parallel to the sides of the filler neck, and that a free end thereof projects out of the filler neck when the tank cap is removed to permit closing of said valve means.

* * * * *